United States Patent

[11] 3,624,453

[72] Inventors Ernest W. Rogers
Horley;
Lewis P. Learney, Crawley Down, both of England
[21] Appl. No. 38,727
[22] Filed May 19, 1970
[45] Patented Nov. 30, 1971
[73] Assignee Redifan Limited
London, England
[32] Priority July 14, 1969
[33] Great Britain
[31] 35,345/69

[54] TRANSISTOR DEVICES AND AMPLIFIERS
10 Claims, 2 Drawing Figs.

[52] U.S. Cl. .......... 317/101 CC, 338/332
[51] Int. Cl. .......... H05k 1/04
[50] Field of Search .......... 317/101 CM, 101 A, 234 (4); 339/17 C; 338/332; 330/32

[56] References Cited

UNITED STATES PATENTS

| | | | |
|---|---|---|---|
| 2,289,791 | 7/1942 | Loftis et al. | 338/332 |
| 2,938,130 | 5/1960 | Noll | 330/23 |
| 3,209,209 | 9/1965 | Mueller | 339/19 C UX |
| 3,512,050 | 5/1970 | Burton et al. | 317/234 |

*Primary Examiner*—David Smith, Jr.
*Attorney*—Larson, Taylor and Hinds

ABSTRACT: An integral transistor and emitter resistor assembly in which a hollow, cylindrical, low-reactance, resistive element is located around the transistor mounting stud for connection between the transistor base electrode and chassis. Optional insulating sleeve and washer members permit the resistor to be mounted above or below the chassis.

TRANSISTOR DEVICES AND AMPLIFIERS

This invention relates to transistor devices and amplifier devices employing transistors.

In transistor amplifiers, for example, of the common emitter configuration and where the transistor is forward biassed to conduct in the absence of an input signal, such as in class A or class B operation, an emitter resistor is used to assist in stabilizing the DC biassing and the RF gain by providing negative feedback.

In one known arrangement, a resistor of low resistive value, for example, less than 2 ohms is used to connect the emitter electrode to one pole of a supply. It is a requirement that the reactance of the path between the emitter and chassis has a low value, so that the RF impedance is maintained at a substantially constant value over a range of radio frequencies, for example 2 to 30 mHz. Unfortunately, where the emitter electrode is connected to the case of the transistor, the path between the emitter electrode and chassis, by way of a conventional wire-ended emitter resistor has an appreciable inductive reactance, causing a loss of gain at the higher frequencies or instability in the associated amplifier.

One object of the present invention is to provide a transistor device with an associated resistor, the combination providing a path both of low resistance and of low impedance.

Another object of the invention is to provide a transistor amplifier, using one or more transistor devices as referred to in the preceding paragraph, having an improved performance in respect of the disadvantages of known amplifiers mentioned above.

Accordingly, one form of the invention provides a transistor device including an outer case having a conductive base surface and an electrode of the device connected to the said base surface, a conductive mounting member extending longitudinally from said base surface and a resistive member of apertured form mounted longitudinally of said mounting member with said mounting member extending through the aperture thereof in electrically insulated relationship to the longitudinal surface of said mounting member, said resistive member being adapted for electrical connection at both ends thereof.

Figure 1:
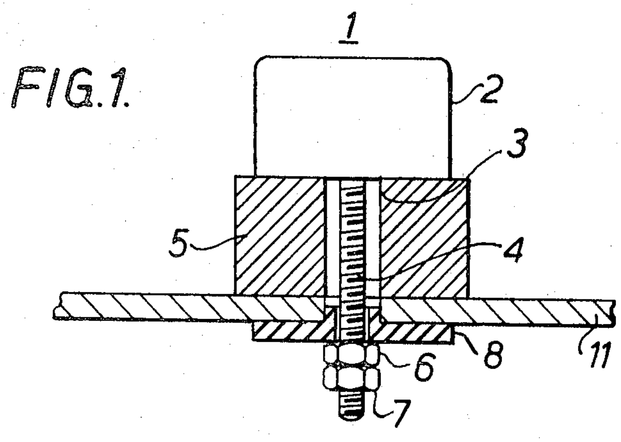
Figure 2:
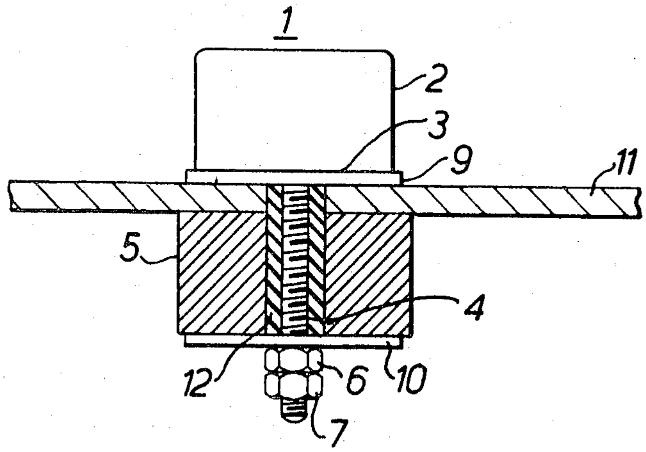

Another form of the invention provides a transistor amplifier including at least one transistor device as defined in the preceding paragraph. In order that the invention may readily be carried into practice, a transistor device according to the invention and alternative methods of mounting the same will now be described in detail, by way of example, with reference to the accompanying drawings, of which:

FIG. 1 shows a transistor device according to the invention mounted on a chassis in a first manner, and FIG. 2 shows a similar transistor device mounted in a second manner.

Referring, first, to both the figures of drawing, the transistor device of the invention, indicated generally at *l*, includes an outer case 2 having a conductive base surface 3, which is connected conductively, to one of the transistor electrodes, in this example to the emitter electrode.

A conductive mounting member comprising a threaded metal stud 4 extends downwardly, as viewed in the figures, from the base 3. The stud 4 carries a nut and a locking nut 6 and 7, respectively.

A hollow cylindrical resistive member 5 is mounted, in both FIGS. 1 and 2, with the stud 4 extending through its central aperture, but not in contact with the inner wall of the element.

Alternative methods of mounting the device *l* are shown in FIGS. 1 and 2.

In FIG. 1, the upper end of the resistive member 5 is in conductive contact with the base 3 and the lower end is in conductive contact with a chassis, part of which is shown at 11. In this mounting arrangement the mounting means further include an insulating washer 8.

From FIG. 1 it will be appreciated that the stud 4 is insulated from both the resistive member 5 and the chassis 11. Current from the emitter electrode flows from the base 3, through the entire body of the element 5 to the chassis 11.

In FIG. 2, the upper end of the resistive member 5 is in conductive contact with the chassis II and the lower end is in conductive contact with a metal washer 10 which is conductively connected to the stud 4 by nut 6. In this case, the conductive base 3 is insulated from the chassis by an insulating washer 9.

From FIG. 2 it will be appreciated that the stud 4 is insulated from the resistive element 5, except at the lower end thereof. Current from the emitter electrode flows from the base 3, through the stud 4, through the washer 10 to the resistive element 5 and through the entire body of the element 5 to the chassis 11.

In the arrangement of FIG. 2, an insulating sleeve 12 surrounds the stud 4 centralizing the stud in the aperture of the member 5 and insulating the stud 4 from the inner wall.

It will be further appreciated that the construction of the invention provides a low-resistance, low-impedance element between the chassis 11 and whichever electrode of the transistor device *l* is connected to the base 3.

The element 5 may conveniently consist of a hollow, cylindrical block of carbon or it may be of other suitable resistive material.

We claim:

1. A transistor device including an outer case having a conductive base surface and an electrode of the device connected to the said base surface, a conductive mounting member extending longitudinally from said base surface and a ohmic resistor of apertured form mounted longitudinally of said mounting member, said mounting member extending through the aperture in said ohmic resistor in electrically insulated relationship to the longitudinal surface of said mounting member, said ohmic resistor being adapted for electrical connection at both ends thereof.

2. A transistor device as claimed in claim 1, in which the ohmic resistor is mounted in contact with said conductive base surface, at one end of said ohmic resistor, and in contact with a conductive chassis member at the other end, said mounting member being adapted for mounting the said device on said chassis member without direct conductive contact between said mounting and said chassis members.

3. A transistor device as claimed in claim 1, in which the said transistor device is mounted on a conductive chassis member with an insulating member separating said conductive base surface from said conductive chassis, and in which the ohmic resistor is mounted in contact with said conductive chassis, at one end of said ohmic resistor, and in contact with a conductive member at the other end, said conductive member being conductively mounted on said mounting member.

4. A transistor amplifier including a chassis member with at least one transistor device as claimed in claim 2 mounted thereon.

5. A transistor amplifier including a chassis member with at least one transistor device as claimed in claim 3 mounted thereon.

6. A transistor device as claimed in claim 1, in which said ohmic resistor is a cylindrical block of resistive material.

7. A transistor device as claimed in claim 6, in which said ohmic resistor is a hollow cylindrical block mounted in spaced relationship to said mounting member, which extends through the hollow part thereof.

8. A transistor device including an outer case having a conductive base surface and an electrode of the device connected to the said base surface, a conductive mounting member extending longitudinally from said base surface and a ohmic resistor having an aperture therein mounted longitudinally of said mounting member, said mounting member extending through the aperture in said ohmic resistor in electrically insulated relationship to the longitudinal surface of said mounting member, and said ohmic resistor being a hollow cylindrical block of resistive material of short axial length and of low electrical impedance from end to end, and being adapted for electrical connection at both ends thereof.

9. A transistor device as claimed in claim 8, in which the ohmic resistor is mounted in contact with said conductive base surface, at one end of said ohmic resistor, and in contact with a conductive chassis member at the other end, said mounting member being adapted for mounting the said device on said chassis member without direct conductive contact between said mounting and said chassis members.

10. A transistor device as claimed in claim 8, in which the said transistor device is mounted on a conductive chassis member with an insulating member separating said conductive base surface from said conductive chassis, and in which the ohmic resistor is mounted in contact with said conductive chassis, at one end of said ohmic resistor, and in contact with a conductive member at the other end, said conductive member being conductively mounted on said mounting member.

* * * * *